United States Patent [19]

Bestler et al.

[11] Patent Number: 5,590,202

[45] Date of Patent: Dec. 31, 1996

[54] COUNTDOWN SYSTEM FOR CONDITIONAL ACCESS MODULE

[75] Inventors: Caitlin B. Bestler, Chicago; Harry A. Hartley, III, Palatine; Khosro M. Rabii, Arlington Heights, all of Ill.

[73] Assignee: Zenith Electronics Corporation, Glenview, Ill.

[21] Appl. No.: 375,319

[22] Filed: Jan. 18, 1995

[51] Int. Cl.$^6$ .................................................. H04L 9/00
[52] U.S. Cl. ...................................... 380/49; 380/20
[58] Field of Search ............................. 380/20, 49, 50, 380/19; 348/5.5; 340/825.31

[56] References Cited

U.S. PATENT DOCUMENTS

| | | | |
|---|---|---|---|
| 4,348,696 | 9/1982 | Beier | 348/5.5 |
| 4,736,422 | 4/1988 | Mason | 380/20 |
| 4,740,890 | 4/1988 | William | 395/186 |
| 4,916,737 | 4/1990 | Chomet et al. | 380/20 |
| 5,272,752 | 12/1993 | Myers et al. | 380/23 |
| 5,400,402 | 3/1995 | Garfinkle | 380/20 |
| 5,420,866 | 5/1995 | Wasilewski | 370/110.1 |
| 5,465,113 | 11/1995 | Gilboy | 348/5.5 |
| 5,473,688 | 12/1995 | Wiedemer | 348/5.5 |

*Primary Examiner*—Thomas H. Tarcza
*Assistant Examiner*—Pinchus M. Laufer

[57] ABSTRACT

A digital conditional access module for a subscriber terminal comprises a decryption device including at least one PID register and an associated countdown register. The decryption device is enabled for decrypting received product packets having a PID matching a PID stored in the PID register so long as the associated countdown register is characterized by a non-zero value. Decryption of a product packet results in the countdown register being decremented by a selected factor, the countdown register being prevented from assuming a zero value by setting its contents to a selected value in response to a received conditional access packet containing a PID matching the PID stored in the PID register. The selected value to which the countdown register is set may also be contained within the received conditional access packet.

13 Claims, 3 Drawing Sheets

Fig. 3A

CA INITIALIZATION PACKET

| PID = 1 | Type | Public S/N | Active & Received CA Key Sources | Active & Received Payload Key Sources | Authorization |
|---|---|---|---|---|---|

Encryption:
- None
- Common Key
- 1. Private Key / 2. Common Key
- Active CA Key Source

Fig. 3B

CA CONFIGURATION LOAD PACKET

| PID = 1 | Type | Public S/N | Received Payload Key Source | Received CA Key Source | Authorization Bit Map |
|---|---|---|---|---|---|

Encryption:
- None
- Active Payload Key Source
- Active CA Key Source

Fig. 3C

CA PID AUTH PACKET

| PID = 1 | Type | Public S/N = 1 | PID | Authorization Level | Countdown Reg Level |
|---|---|---|---|---|---|

Encryption:
- None
- Active Payload Key Source
- Active CA Key Source

Fig. 4

| PID Reg$_0$ | PID Reg$_1$ | PID Reg$_2$ | PID Reg$_3$ | ..... | PID Reg$_9$ |
|---|---|---|---|---|---|
| CD Reg$_0$ | CD Reg$_1$ | CD Reg$_2$ | CD Reg$_3$ | ..... | CD Reg$_9$ |

72a, 72b, 72c, 72d, 72j
74a, 74b, 74c, 74d, 74j

COUNTDOWN SYSTEM FOR CONDITIONAL ACCESS MODULE

BACKGROUND OF THE INVENTION

The present invention relates generally to conditional access systems of the type used to control cable subscriber set-top boxes and particularly concerns a countdown technique for increasing the security of such conditional access systems.

Conditional access systems for subscriber units such as cable subscriber set-top box decoders are well-known in the art. Conditional access is conventionally achieved by downloading one or more authorization levels for storage in the decoder. The stored authorization levels may be represented by a bit map or a list of individual multi-bit codes, or a combination of both. Each received subscription program, which is normally scrambled to prevent access thereto by an unauthorized subscriber, includes an authorization code (sometimes referred to as a program tag) identifying the associated program. If the program tag corresponds to an authorized level in the stored bit map or to a stored listed authorization level of the subscriber, a descrambling circuit within the subscriber's decoder is enabled to descramble the signal for viewing by the subscriber. On the other hand, if the received program tag does not match any stored authorization level descrambling of the accompanying program is inhibited.

Depending on the desired resolution, recent advances in technology have made possible the transmission and reception of one or more digitally compressed television signals over a 6 MHz television channel. The television signal is preferably compressed and arranged for transport in accordance with international standards established by the Moving Pictures Expert Group (MPEG). In accordance with the MPEG standard, the compressed digital television information may be arranged for transmission in the form of a multiplexed transport stream of fixed length MPEG packets including, for example, video packets, audio packets and conditional access packets (all packets other than conditional access packets being referred to as product packets). Each packet in the transport stream includes a 4-byte header comprising a 13-bit packet identification code (PID) identifying the so-called payload (184 bytes) of the respective packet. A PID having a value equal to one (i.e. 00 . . . 1) has been reserved for use with conditional access packets.

In a general sense, conditional access for digitally compressed subscription systems of the foregoing type may be achieved using techniques quite similar to those employed in prior art analog subscription systems. However, since it is anticipated that the digital systems will make much more extensive use of services such as video-on-demand, it is desirable to provide increased confidence that the operation of the conditional access system is largely tamper-proof. For example, the security of the conditional access system may be compromised by interrupting the conditional access data stream to the decoder, the feasibility of such interruption being facilitated by the fact that the MPEG packet headers are not encrypted. Such interruption of the conditional access data could lead to a situation where, for example, it becomes impossible to retract a previously established authorization level. This presents the subscription system operator with the dilemma of not being able to reuse authorization levels in a timely manner or assume the risk that a non-paying subscriber may have access to the service associated with a reused authorization level. The problem is compounded in connection with services such as pay-per-view television which require frequent recycling of authorization levels.

OBJECTS OF THE INVENTION

It is therefore a basic object of the present invention to provide an improved conditional access system for a subscription service such as a pay cable television system.

It is a more specific object of the invention to provide a conditional access system which is relatively resistant to unauthorized tampering even though the PID's identifying the conditional access data stream are not encrypted.

It is yet a more specific object of the invention to provide a conditional access system in which interruption of the conditional access data stream will automatically result in denial of further subscription services.

BRIEF DESCRIPTION OF THE DRAWINGS

These and other objects and advances of the invention will be apparent upon reading the following description in conjunction with the drawings, in which:

FIGS. 3A–3B are diagrammatic representations of different CA packets according to the invention; and FIG. 4 illustrates the PID and countdown registers of the DCAM of FIG. 2.

DESCRIPTION OF THE PREFERRED EMBODIMENT

Figure 1:
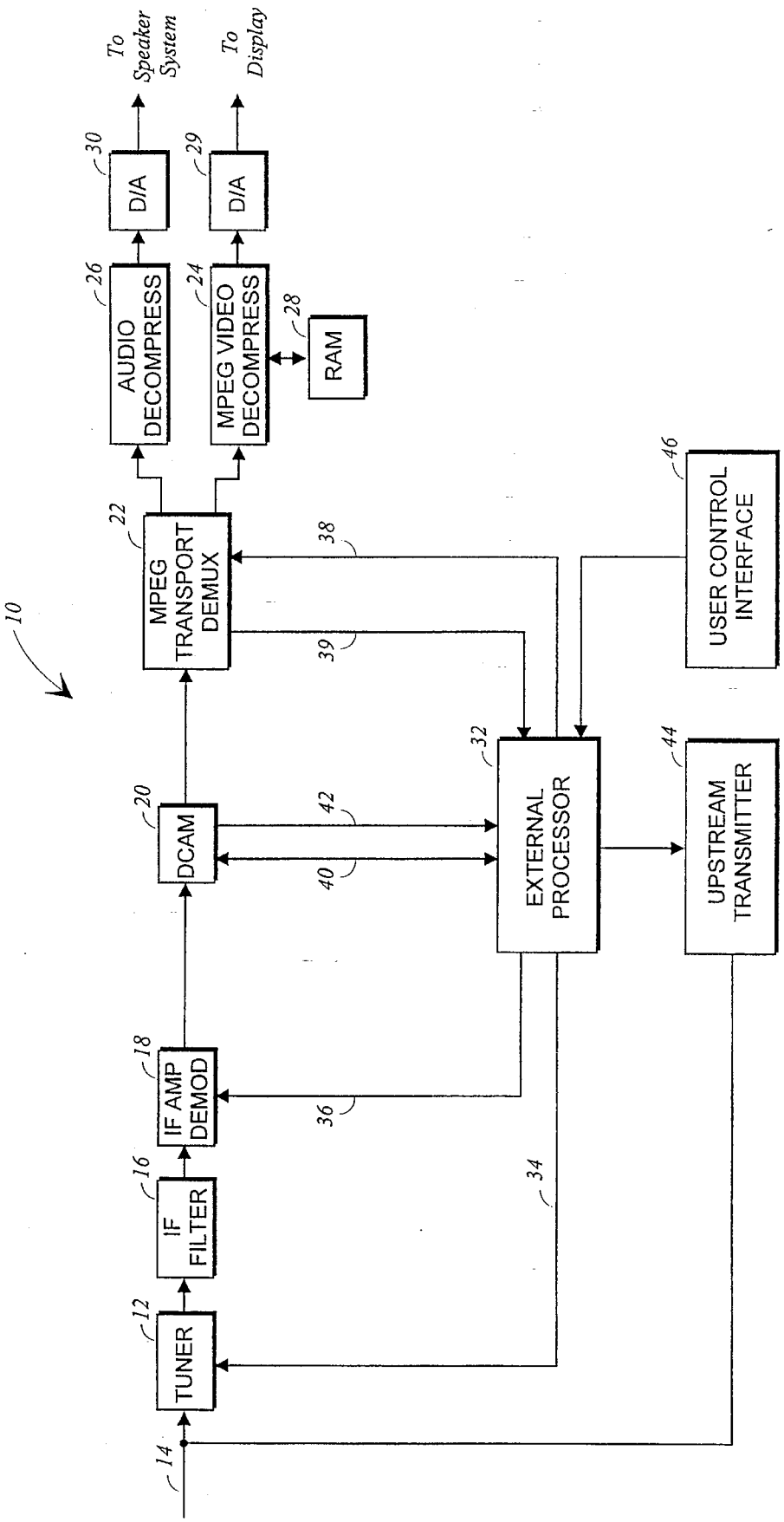
FIG. 1 is a simplified block diagram of a subscription television decoder.

FIG. 1 sets forth a block diagram of a television subscriber terminal constructed in accordance with the present invention and generally referenced by numeral 10. Subscriber terminal 10 includes a tuner 12 coupled to a cable television distribution system (not shown) or other suitable transmission medium by a cable 14. The output of tuner 12 is coupled to an intermediate frequency (IF) filter 16, typically a SAW filter, and therefrom to the input of an IF amplifier and demodulator circuit 18. Demodulator 18 may comprise, for example, a multi-level VSB or QAM demodulator.

The output of demodulator 18 comprises an MPEG transport bitstream including a series of MPEG product and conditional access (CA) packets. As previously mentioned, each such packet includes an unencrypted 4-byte header comprising a 13-bit PID identifying the contents of the packet followed by 184-bytes of encrypted payload, 20-bytes of which are used for forward error correction. A product packet may comprise a compressed video packet, a compressed audio packet or a packet containing auxiliary data. Each such packet is identified by its own unique PID, with a PID having a value of one (00 . . . 01) reserved for CA packets. Depending on the degree of compression employed and on the maximum bit-rate provided by the transmission system, the transport bitstream derived from a tuned 6 MHz television channel may represent one or more television programs, the components (e.g. video and audio) of each television program being identified by their own respective PID's.

The MPEG transport bitstream developed at the output of demodulator 18 is coupled to a digital condition access module (DCAM) 20 which will be described in further detail hereinafter. For now it is sufficient to understand that DCAM 20 is responsive to CA packets multiplexed in the transport bitstream for selectively authorizing and deauthorizing subscriber terminal 10 for various television programs and other services. DCAM 20 is also operative for decrypting the payloads of product packets having PID's corresponding to a program selected for viewing by the subscriber and for which the subscriber has appropriate authorization. The output of DCAM 20 is coupled to an MPEG transport demultiplexer 22 which couples the decrypted video packets to a video decompression circuit 24 and the decrypted audio packets to an audio decompression circuit 26. Video decompression circuit 24 may include a random access memory 28 coupled thereto. The decompressed video signal developed at the output of video decompression circuit 24 is applied to a D/A converter 29 which is coupled to a suitable video display. Correspondingly, the decompressed audio signal developed at the output of audio decompression circuit 26 is applied to a D/A converter 30 which is coupled to a suitable audio system.

Subscriber terminal 10 further includes a microprocessor 32 having a channel selection output 34 for controlling tuner 12 (i.e. for tuning a selected 6 MHz television channel) and an output 36 for controlling demodulator 18. Microprocessor 32 also has an output 38 for controlling transport demultiplexer 22 and receives data, e.g. network directories and program map tables, from the demultiplexer over a line 39. Microprocessor 32 is further bi-directionally coupled to DCAM 20 by a bus 40 and is supplied with an interrupt signal by DCAM 20 over a line 42. An upstream transmitter 44 is supplied by microprocessor 32 and has an output coupled to cable 14 for providing upstream transmissions over the cable distribution system. Microprocessor 32 is responsive to signals from a user control interface 46 operable by a subscriber for selecting a program for viewing.

In operation, a plurality of broadcast 6 MHz RF channels are coupled by cable 14 to the input of tuner 12 which in response to a channel selection signal supplied by microprocessor 32 couples a selected channel to intermediate frequency filter 16. Filter 16 may be constructed in accordance with conventional fabrication techniques and may, for example, include a conventional surface acoustic wave filter or its equivalent. The output of filter 16 is demodulated by intermediate frequency amplifier and demodulator circuit 18. Demodulator 18, which may comprise a synchronous demodulator, recovers the digital MPEG transport bitstream comprising CA packets and product packets representing one or more television programs. While different transmission signal formats and methods may be utilized in communicating data through the cable distribution system, the preferred embodiment shown in FIG. 1 utilizes a digital vestigial sideband (VSB) modulation system in which N-level (e.g. 16, 8, 4 or 2-level) symbols having a symbol rate of approximately 10.76 megahertz are transmitted and received over cable 14. The transport bitstream generated at the output of demodulator 18 is further selectively processed by DCAM 20 and thereafter demultiplexed in demultiplex circuit 22 to provide selected input video and audio signals to decompression circuits 24 and 26 respectively. Circuits 24 and 26 perform conventional video and audio decompression operations upon the applied video and audio data to produce decompressed video and audio signals which are converted to corresponding analog signals within digital to analog converters 29 and 30. The analog signals thus provided may be applied to the video display and audio system of the subscriber's television receiver.

Figure 2:
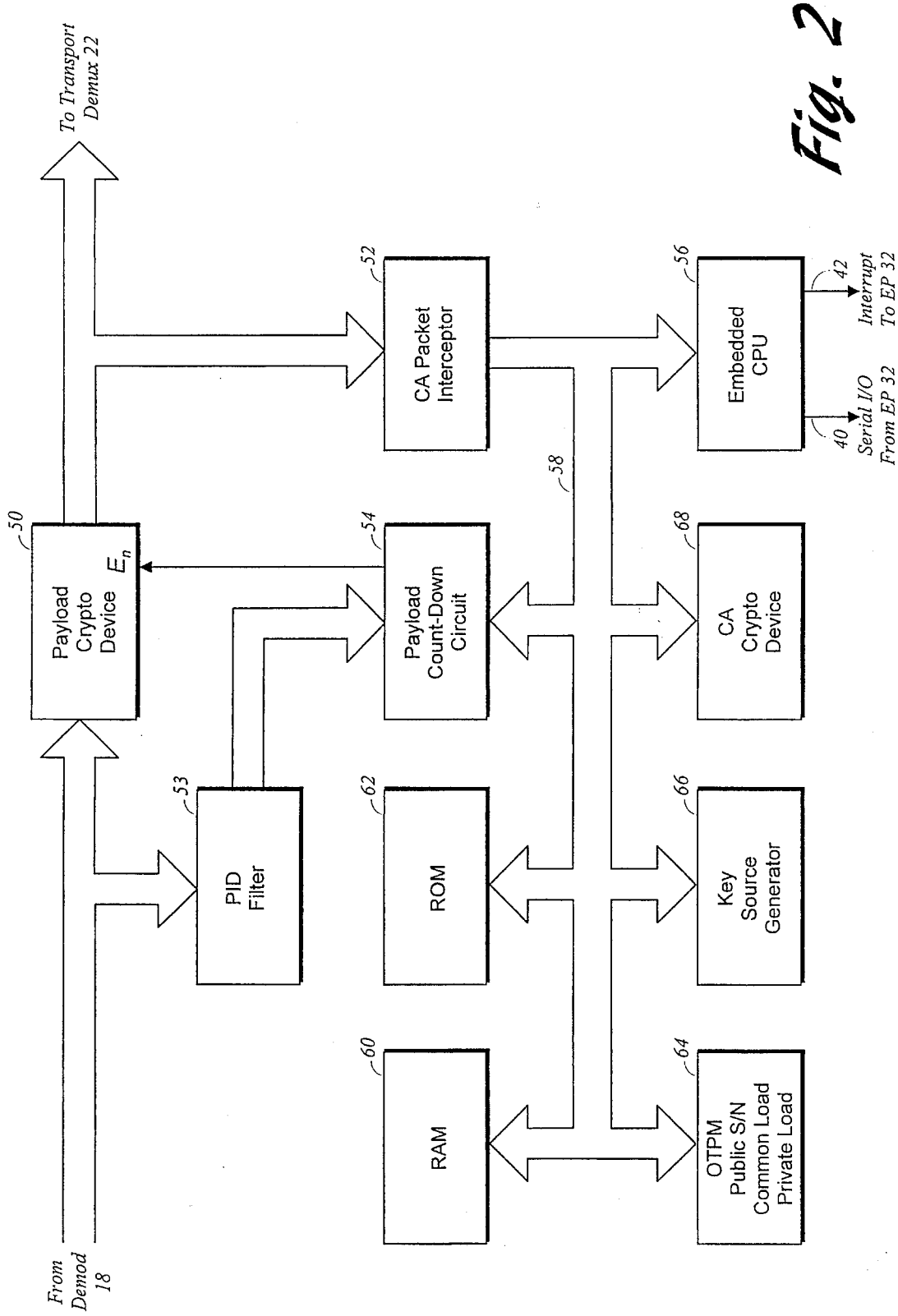
FIG. 2 is a block diagram of the DCAM shown in FIG. 1.

The structure of DCAM 20 is shown in greater detail in FIG. 2. DCAM 20 preferably comprises an application specific integrated circuit (ASIC) which implements the conditional access and decryption functions of subscriber terminal 10. As shown in FIG. 2, the transport bitstream from demodulator 18 is supplied to a payload crypto device 50, whose output is coupled to transport demultiplexer 22 and also supplies a CA packet interceptor 52. The transport bitstream is also supplied through a PID filter 53 to a payload countdown circuit 54 which includes an output coupled to the Enable input of payload crypto device 50. The output of CA packet interceptor 52 is supplied to an embedded CPU 56 over a bus 58. Bus 58 also couples CPU 56 to payload countdown circuit 54, a RAM 60, a ROM 62, a one-time-programmable memory (OTPM) 64, a key source generator 66 and a CA crypto device 68. Communications between CPU 56 and processor 32 (see FIG. 1) are effected over lines 40 and 42.

The operation of DCAM 20 is controlled by CA packets (PID =1) coupled by CA packet interceptor 52 to CPU 56. There are a number of different types of CA packets (identified by the first 3-bits of the packet payload) including CA initialization packets, CA configuration load packets and CA PID authorization packets. The CA initialization packets (see FIG. 3A) are used to initialize various keys used in DCAM 20 and to initialize the subscriber authorization levels of a bit map (e.g. 256 bits) and an authorization list stored in RAM 60. In particular, each subscriber DCAM 20 includes a unique 4-byte public serial number (S/N), a common load and a private (master) load all stored in OTPM 64. The common and private (master) loads are combined with selected bytes of ROM 62, which includes a stored program for controlling the operation of cPU 56, for providing respective common and private (master) keys. Each subscriber DCAM further includes active CA and payload key sources and received CA and payload key sources provided by key source generator 66. Each CA initialization packet includes the public S/N of one or more subscriber terminals together with the associated active and received CA and payload key sources and authorization levels. The received public S/N, which is encrypted with the network common key, is decrypted by payload crypto device 50 in response to the common key derived from OTPM 64. The decrypted public S/N is supplied to CPU 56 which determines whether it matches the public S/N stored in OTPM 64. If a match exists, CPU 56 fetches the received active and received CA key sources for storage in key source generator 66. These key sources are encrypted first with the private key corresponding to the packet public S/N and then with the network common key. They are therefore decrypted first by payload crypto device 50 using the common key from OTPM 64 and then by the CA crypto device 68 using the private key from OTPM 64. The active CA key source now provided by key source generator 66 is used to build a decryption table used by CA crypto device 68 to decrypt further CA encrypted data bytes. Such further data bytes include the active and received payload key sources which after decryption are stored in key source generator 66 and authorization levels which after decryption are stored in the bit map and authorization list of RAM 60.

The CA configuration load packet is illustrated in FIG. 3B. It is similar in format to the CA initialization packet and is used to provide new CA and payload key sources for key source generator 66. The packet is also used to refresh the authorization bit map stored in RAM 60. As shown in FIG. 3B, the packet type and public S/N are encrypted using the active payload key source previously downloaded in a CA initialization packet and are therefore decrypted by payload crypto device 50 in response to the corresponding decryption table. If CPU 56 establishes that the decrypted public S/N matches the public S/N stored in OTPM 64, the received payload and CA key sources are decrypted by CA crypto device 68. These key sources will become the active key sources if they differ from the current active key sources and result in rebuilt decryption tables for payload and CA crypto devices 50 and 68.

Processing of the CA initialization and configuration load packets therefore results in DCAM 20 having been individually addressed to download various decrypted critical operating parameters (i.e. decryption keys and authorization levels). In particular, the CA key source is downloaded after it is decrypted using the private key of DCAM 20, the download CA key source being used in turn to provide for downloading of the payload key source. Moreover, a would-be pirate can neither artificially create nor selectively filter subsequent CA packets since the packet payload, including CA packet type, of each such CA packet is encrypted using the payload and CA key sources. As will be explained in further detail, the inability to either create illegitimate CA packets or selectively filter de-authorizing packets prevents a would-be pirate from compromising system security.

The format of a CA PID authorization packet is illustrated in FIG. 3C. This packet, which is globally addressed using a public S/N=1, is the most frequently transmitted CA packet. The packet comprises a type code and a public S/N=1, both encrypted using the active payload key source and both decrypted by payload crypto device 50. The packet further comprises one or more PID's, each with an associated authorization level and countdown register level, all encrypted using the active CA key source and therefore decrypted by CA crypto device 68. As will be explained in further detail hereinafter, each active PID within a given 6 MHz channel must be transmitted and received by DCAM 20 in a CA PID authorization packet at a predetermined minimum rate in order to maintain payload crypto device 50 operable for decrypting payloads of product packets with corresponding PID's. Therefore, if the CA bitstream to DCAM 20 is interrupted, payload crypto device 50 will become inhibited and thereby cease decrypting product packets.

More specifically, assume a subscriber elects to view a particular television program contained within a tuned 6 MHz television channel. The selected program has an authorization level "A" and is comprised of packets having PID's 317, 318 and 319. PID 317 may, for example, identify compressed video packets, PID 318 compressed audio packets and PID 319 auxiliary data packets. Upon selecting the program (using user control interface 46), external processor 32 causes CPU 56 to determine whether the subscriber is authorized to view the program. That is, CPU 56 checks RAM 60 to determine if authorization level "A" is found in the stored authorization bit map or authorization list. Assuming authorization level "A" is found in RAM 60, the three PID's 317, 318 and 319 of the selected program are transferred over bus 58 for storage in respective PID registers 72a, 72b and 72c (see FIG. 4) of payload countdown circuit 54. At the same time, respective associated countdown registers 74a, 74b, and 74c of countdown circuit 54 are set to selected values.

Payload crypto device 50 is operative for decrypting product packets only if the PID of the respective packet is stored in one of the ten PID registers 72a–72j of countdown circuit 54 (the packet PID's are supplied to countdown circuit 54 by PID filter 53) and the contents of the corresponding countdown register does not equal zero. Therefore, payload crypto device 50 begins decrypting payloads of product packets having PID's 317, 318 and 319 and couples the decrypted packet payloads (together with all unencrypted packets) to transport demultiplexer 22 for further processing. Moreover, each time a product packet having a PID stored in a PID register 72a–72C is received by countdown circuit 54, the associated PID countdown register 74a–74c of countdown circuit 54 is decremented by a factor of unity. If any one of the countdown registers reaches a value of zero, countdown circuit 54 inhibits payload crypto device from decrypting any further packets having the corresponding PID. For example, if countdown register 74a, which is associated with PID register 72a storing PID 317, reaches a zero count, countdown circuit 54 will inhibit payload crypto device 50 from decrypting any further product packets having PID 317.

However, under normal operating conditions CA PID authorizations packets are transmitted and received at a rate sufficient to prevent anyone of the countdown registers 74a–74c from reaching a zero count. In particular, after verification by CPU 56 that the authorization level of a received CA PID authorization packet matches a subscriber authorization level in RAM 60 and that its PID matches a PID stored in one of the PID registers 72a–72j, the associated countdown register 74a–74j is set to the countdown register level value of the received CA PID authorization packet. The countdown register level preferably comprises one byte allowing the countdown register to be set to any one of 256 different values. It will thus be seen that by operating the network such that appropriate CA PID authorization packets (i.e. having selected PID/authorization level pairs) are transmitted and received before a given countdown register reaches a zero value, payload crypto device 50 will remain operative for decrypting product packets having the corresponding PID's. Authorization level matches may be established by searching the authorization list and bit map of RAM 60 in response to each received CA PID authorization packet. Alternatively, the authorization list and bit map may be searched only once in response to the viewer's program request. The corresponding authorization level, assuming that a match exists, is then stored in a reserved portion of RAM 60 associated with the PID's stored in PID registers 72a–72j and is checked for a match with each received CA PID authorization packet. The latter approach is, of course, less CPU intensive since a search of RAM 60 is not effected in response to each received CA PID authorization packet.

Assume, now for example, that a subscriber interrupts the CA bitstream in an attempt to prevent deauthorization by denying network access to the authorization levels stored in RAM 60. While interruption of the CA bitstream may achieve this goal, it will also interrupt receipt of the CA PID authorization packets, thereby allowing the PID countdown registers 74a–74J to assume zero counts and inhibit decryption of the product packets having PID's stored in PID registers 72a–72j. As a result, the subscriber will be denied access to the program even though the network cannot access RAM 60 for deauthorizing the corresponding service level.

As a further option, the operation of DCAM 20 can be enhanced such that countdown registers 74a–74j are each also decremented in response to the receipt of any CA packet (PID=1). This will in effect clear (i.e. set to zero) all countdown registers 74a–74j having corresponding PID registers 72a–72j storing inactive PID's.

What has thus been described is a novel conditional access system having a unique countdown system providing increased security against unauthorized tampering. It is recognized that numerous changes in the described embodiment of the invention will be apparent to those skilled in the art without departing from its true spirit and scope. The invention is to be limited only as defined in the claims.

We claim:

1. A conditional access system for a subscriber terminal comprising:

means operable for decrypting a received product packet identified by a PID;

means including a PID register and an associated countdown register for enabling said decrypting means in response to the value of said received PID matching the value stored in said PID register and said associated countdown register having a value other than a first selected value;

means for decrementing said countdown register each time one of said product packets is decrypted; and means for setting the countdown register to a second selected value in response to a received CA packet.

2. The system of claim 1 wherein said second selected value is greater than said first selected value.

3. The system of claim 1 wherein said second selected value is contained in said received CA packet.

4. The system of claim 1 wherein said received CA packet comprises a globally addressed CA packet.

5. The system of claim 1 wherein said means for decrementing comprises means for decrementing said countdown register in response to a received CA packet.

6. The system of claim 1 wherein said means for setting comprises means for setting said countdown register in response to a CA packet containing a PID matching the PID stored in said PID register.

7. The system of claim 1 wherein said means for setting comprises means for setting said countdown register in response to a CA packet containing a selected subscriber authorization level.

8. The system of claim 1 wherein said means for enabling comprises plural ones of said PID registers and associated countdown registers.

9. A method of controlling decryption of product packets contained within a multiplexed stream of product and conditional access packets comprising:

decrypting selected ones of said product packets;

decrementing a count each time one of said selected product packets is decrypted;

inhibiting further decryption of said selected product packets if said count assumes a first selected value; and setting said count to a second selected value different from said first value in response to a received conditional access packet.

10. The method of claim 9 wherein said second selected value is greater than said first selected value.

11. The method of claim 9 wherein said second selected value is identified in said received conditional access packet.

12. The method of claim 9 including decrementing said count in response to received conditional access packets.

13. The method of claim 9 including setting said count to said second selected value in response to a received conditional access packet identifying said selected product packets.

\* \* \* \* \*